United States Patent
Di et al.

(10) Patent No.: US 10,140,128 B2
(45) Date of Patent: Nov. 27, 2018

(54) PARALLELIZED MULTIPLE DISPATCH SYSTEM AND METHOD FOR ORDERED QUEUE ARBITRATION

(71) Applicant: VIA ALLIANCE SEMICONDUCTOR CO., LTD., Shanghai (CN)

(72) Inventors: Qianli Di, Beijing (CN); Jianbin Wang, Beijing (CN); Weili Li, Beijing (CN); Xiaoyuan Yu, Beijing (CN); Xin Yu Gao, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 421 days.

(21) Appl. No.: 14/643,051

(22) Filed: Mar. 10, 2015

(65) Prior Publication Data

US 2016/0259648 A1 Sep. 8, 2016

(30) Foreign Application Priority Data

Mar. 3, 2015 (CN) .......................... 2015 1 0093951

(51) Int. Cl.
*G06F 9/30* (2018.01)
*G06F 9/38* (2018.01)

(52) U.S. Cl.
CPC .......... *G06F 9/3855* (2013.01); *G06F 9/3836* (2013.01); *G06F 9/3851* (2013.01)

(58) Field of Classification Search
None
See application file for complete search history.

(56) References Cited

U.S. PATENT DOCUMENTS

| | | |
|---|---|---|
| 5,649,138 A | 7/1997 | Ireton |
| 5,881,224 A | 3/1999 | Ranson et al. |
| 5,887,003 A | 3/1999 | Ranson et al. |
| 5,978,896 A | 11/1999 | Kahle et al. |
| 6,247,114 B1 | 6/2001 | Trull |
| 6,253,287 B1 | 6/2001 | Green |
| 6,324,640 B1 | 11/2001 | Le et al. |
| 6,697,939 B1 | 2/2004 | Kahle |

(Continued)

*Primary Examiner* — Corey S Faherty
(74) *Attorney, Agent, or Firm* — McClure, Qualey & Rodack, LLP

(57) ABSTRACT

A parallelized multiple dispatch ordered queue including an ordered queue, qualify logic, ordered select logic, and dispatch logic. The ordered queue stores candidates in order from oldest to youngest into multiple entries. The ordered queue is divided into N groups in which an i'th group includes every i'th entry of every N entries of the ordered queue, wherein i is an integer less than or equal to N. The qualify logic determines whether any candidate is ready to be dispatched. The ordered select logic respectively determines the oldest candidate in each group that is ready to be dispatched. The dispatch logic dispatches the oldest ready candidates in parallel. The shift logic shifts the stored candidates in the ordered queue to fill any vacant entries between remaining ones of the stored candidates without changing an order of the remaining ones of the stored candidates in the ordered queue. The ordered queue may have any size or depth and N is any suitable integer determining the number of candidates (e.g., instructions) that may be dispatched in parallel.

20 Claims, 7 Drawing Sheets

(56) References Cited

U.S. PATENT DOCUMENTS

| | | | |
|---|---|---|---|
| 7,984,271 B2 * | 7/2011 | Sakamoto | G06F 9/30181 |
| | | | 712/217 |
| 2003/0014613 A1 | 1/2003 | Soni | |
| 2007/0198812 A1 | 8/2007 | Abernathy et al. | |
| 2012/0204004 A1 | 8/2012 | Dockser et al. | |
| 2012/0278593 A1 | 11/2012 | Clark et al. | |
| 2015/0106595 A1 | 4/2015 | Khot et al. | |

* cited by examiner

PARALLELIZED MULTIPLE DISPATCH SYSTEM AND METHOD FOR ORDERED QUEUE ARBITRATION

FIELD OF THE INVENTION

The present invention relates in general to ordered queues, and more particularly to a parallelized multiple dispatch system and method for ordered queue arbitration that may be used within microprocessors.

DESCRIPTION OF THE RELATED ART

Many modern microprocessors are superscalar in which they include multiple execution units and are capable of dispatching multiple instructions to the execution units in a single clock cycle. Many modern microprocessors also perform out-of-order execution. That is, the microprocessor may execute instructions out of the order specified by the instructions of the software program. Superscalar out-of-order execution microprocessors typically attempt to maintain a relatively large pool of outstanding instructions so that they can take advantage of a larger amount of instruction parallelism.

The microprocessor executes the instructions of an instruction set architecture, such as the x86 instruction set architecture or the like. In many such microprocessors, the instructions of the instruction set architecture, often referred to as macroinstructions, are first translated into microinstructions (or micro-operations or "μops") that are issued to a reservation stations module that dispatches the instructions to the execution units. The microinstructions are more generally referred to herein simply as the instructions. The instructions are also issued to a reorder buffer which ensures in-order retirement of the instructions.

The reservation stations module includes one or more ordered queues. When there are multiple instructions that are ready for dispatch from one of the reservation station queues, meaning that the instructions have met the conditions for being dispatched to an execution unit, then the oldest one of the ready instructions is dispatched to a corresponding execution unit. An instruction is ready for dispatch when an execution unit is available, and any operands necessary for instruction execution are also available. It is a relatively simple matter for the hardware to determine the oldest candidate instruction ready for dispatch. It may be desired, however, to dispatch more than one candidate from a single reservation station queue while also maintaining "order" as the arbitration priority. It is more difficult, however, for the hardware to determine the next oldest candidate while meeting timing requirements since this determination is serialized. In particular, the oldest candidate had to be determined first and only then could the next oldest be determined. The serialized determination failed to meet timing requirements, however, making it difficult to dispatch multiple instructions at a time.

SUMMARY OF THE INVENTION

A parallelized multiple dispatch ordered queue according to one embodiment of the present invention includes an ordered queue, qualify logic, ordered select logic, and dispatch logic. The ordered queue is configured to store candidates in order from oldest to youngest into multiple entries, in which the ordered queue is divided into N groups in which an i'th group includes every i'th entry of every N entries of the ordered queue, wherein i is an integer less than or equal to N. The qualify logic determines whether any of the stored candidates are ready to be dispatched from the ordered queue. The ordered select logic respectively determines an oldest candidate in each group of the ordered queue that is ready to be dispatched. The dispatch logic dispatches candidates from each group in parallel, in which the arbitration logic dispatches the oldest candidate in each group that is ready to be dispatched and leaving at least one vacant entry in the ordered queue. The shift logic shifts the stored candidates in the ordered queue to fill the vacant entries between remaining ones of the stored candidates without changing an order of the remaining ones of the stored candidates in the ordered queue.

The ordered queue may have any size or depth. In one embodiment, the ordered queue is implemented in a microprocessor and the number of execution units of the same type determines the number of candidates that may be dispatched in parallel. For example, N may be 2 for dividing the ordered queue into an even group and an odd group. If it is desired to dispatch up to 3 candidates at a time, then the ordered queue is divided into 3 groups. N may also be 4 or more.

The candidates may be instructions of a microprocessor, in which the qualifying logic determines whether any stored instruction is ready for execution by the microprocessor. The microprocessor may include N execution units of the same type (e.g., the N units are each an integer execution unit or each is a floating point execution unit, etc.).

A microprocessor according to one embodiment includes a register alias table, parallelized multiple dispatch ordered queue, and N execution units of the same type. The parallelized multiple dispatch ordered queue includes an ordered queue, qualify logic, ordered select logic, dispatch logic, and shift logic.

A method of dispatching multiple candidates from an ordered queue in parallel according to one embodiment includes storing candidates in order into an ordered queue from oldest to youngest, in which the ordered queue is divided into N groups in which an i'th group includes every i'th entry of every N entries of the ordered queue, wherein i is an integer less than or equal to N, determining whether any of the stored candidates in the ordered queue is ready to be dispatched from the ordered queue, determining an oldest candidate respectively in each group of the ordered queue that is ready to be dispatched, dispatching candidates from the N groups in parallel including said oldest candidate in each group that is ready to be dispatched and leaving at least one vacant entry in the ordered queue, and shifting the stored candidates in the ordered queue to fill the vacant entry between remaining ones of the stored candidates without changing an order of the remaining ones of the stored candidates in the ordered queue.

BRIEF DESCRIPTION OF THE DRAWINGS

The benefits, features, and advantages of the present invention will become better understood with regard to the following description, and accompanying drawings where.

DETAILED DESCRIPTION

The inventors have recognized the desirability of dispatching more than one candidate from an ordered queue while also maintaining arbitration priority "order". They have therefore developed a system and method of parallelized multiple dispatch for ordered queue arbitration as described herein. The primary queue is divided into multiple sub-queues or groups, and the oldest candidates (values or instructions or the like) that are ready for dispatch from each of the groups are separately dispatched in parallel with each other. Each instruction is dispatched to one of multiple executions of the same type. The method is easy to implement in hardware and maintains arbitration priority order. Also, the primary queue structure is shifted in response to the number of candidates dispatched from the queue to maintain order within the queue itself. The following paragraphs are descriptions of several embodiments of the invention, where "the ordered queue" mentioned above is Reservation Station (RS) queues, and "the candidate" mentioned above is microinstructions or referred to simply as instructions. It is worthy to note, however, that the present invention is not intended to be limited to the particular embodiments shown and described below. Dispatching more than one candidate from an ordered queue while also maintaining arbitration priority "order" is within the scope of the invention.

Figure 1:
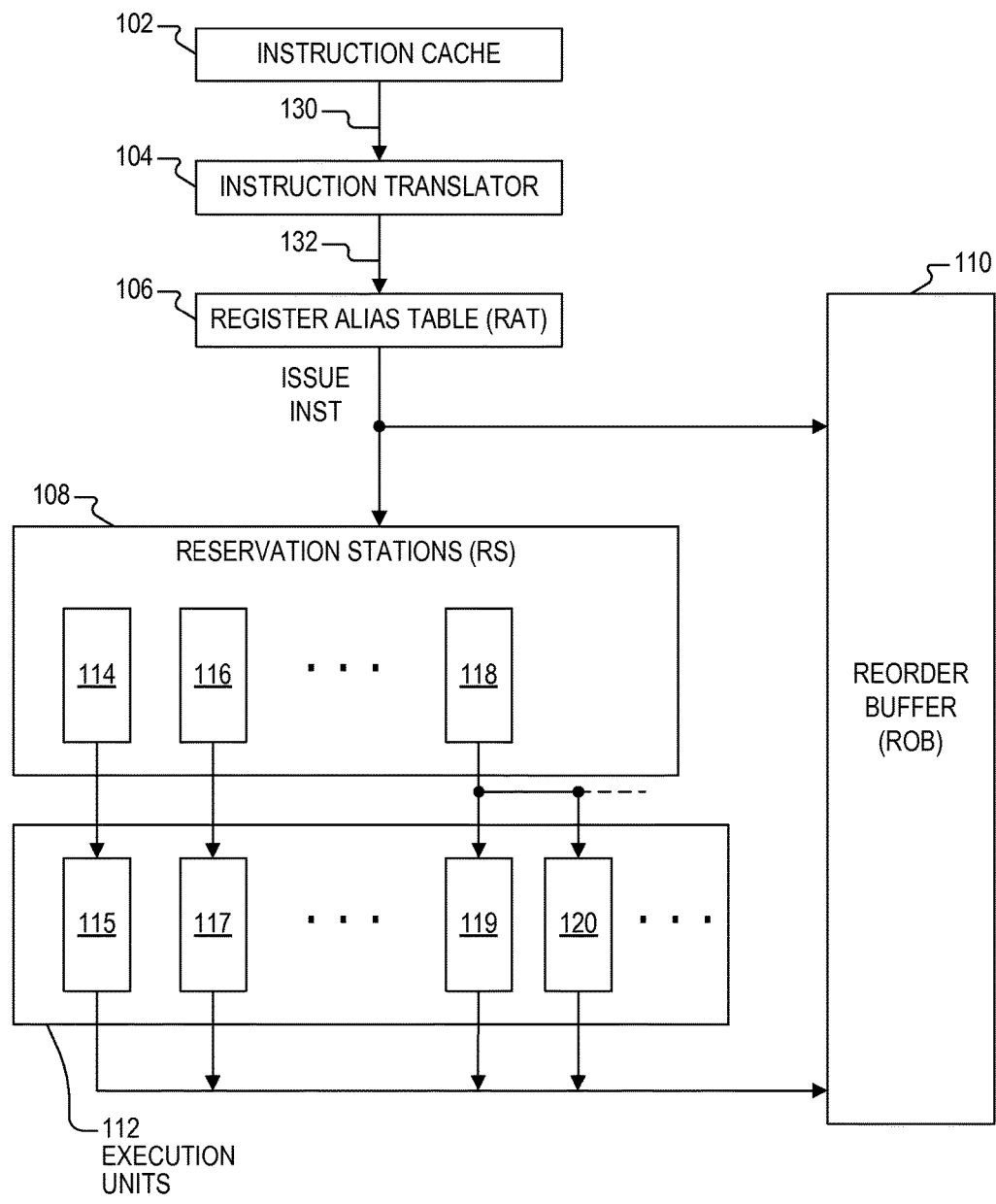
FIG. 1 is a simplified block diagram of a superscalar, pipelined microprocessor implemented according to one embodiment of the present invention.

FIG. 1 is a simplified block diagram of a superscalar, pipelined microprocessor 100 implemented according to one embodiment of the present invention. The microprocessor 100 includes an instruction cache 102 that caches macroinstructions 130 of an instruction set architecture, such as the x86 instruction set architecture or the like. Additional or alternative instruction set architectures are contemplated. The microprocessor 100 includes an instruction translator 104 that receives and translates the macroinstructions 130 into microinstructions 132. The microinstructions 132 are then provided to a register alias table (RAT) 106, which generates microinstruction dependencies and issues the microinstructions 132 in program order to a reservation stations module 108 and to a reorder buffer (ROB) 110. The ROB 110 stores an entry for every instruction issued from the RAT 106. The reservation stations module 108 module dispatches the microinstructions to an appropriate one of multiple execution units 112. The execution units 112 may include one or more integer execution units, such as an integer arithmetic/logic unit (ALU) or the like, one or more floating point execution units, such as including a single-instruction-multiple-data (SIMD) execution unit such as MMX and SSE units or the like, a memory order buffer (MOB), etc. A MOB generally handles memory type instructions, such as including load and store instruction execution pipes (not shown) or the like. The execution units 112 provide their results to the ROB 110, which ensures in-order retirement of instructions.

The microinstructions issued from the RAT 106 (ISSUE INST) may typically be referred to as microinstructions, but are more generally referred to herein simply as "instructions." In one embodiment, the reservation stations module 108 is configured in a distributed manner including multiple RS queues, in which each RS queue dispatches one or more instructions to corresponding execution units 112 when the instructions are ready to be executed.

In many configurations, a separate RS queue is provided for each execution unit. As shown, for example, a first RS queue 114 feeds a first execution unit 115, a second queue 116 feeds a second execution unit 117, and so on for as many execution units that may be included. In a conventional configuration, for example, six different RS queues fed six different execution units, including 2 integer execution units, 2 floating point execution units, a load execution unit and a store execution unit. As described herein, however, any one or more of the RS queues may be implemented according to parallelized multiple dispatch for ordered queue arbitration according to an embodiment of the present invention. As shown, for example, one RS queue 118 dispatches instructions to two or more separate execution units of the same type, shown at least as execution units 119 and 120. The RS queue 118 may be configured to provide instructions to any number of substantially similar execution units, such as 3 or 4 or more. The execution units receiving instructions from a common RS queue are of the same type for executing the same types of instructions. For example, both execution units 119 and 120 may be integer execution units or floating point execution units or the like. In other embodiments, any one or more up to all of the execution units 112 may be implemented according to parallelized multiple dispatch for ordered queue arbitration similar to the RS queue 118.

Figure 2:
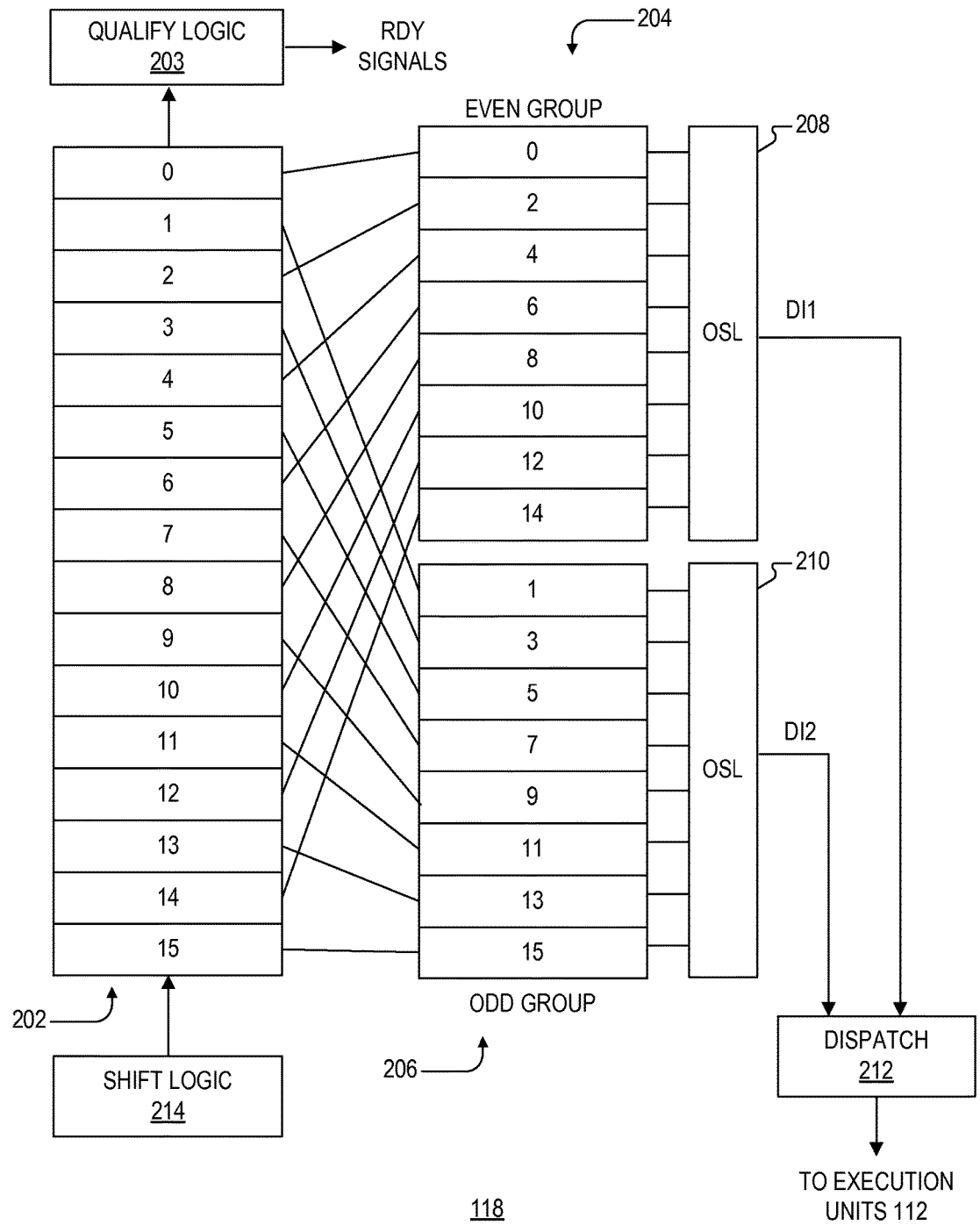
FIG. 2 is a simplified block diagram of the RS queue of FIG. 1 according to one embodiment of the present invention in which an ordered shift queue is divided into two groups.

FIG. 2 is a simplified block diagram of the RS queue 118 according to one embodiment of the present invention in which an ordered shift queue 202 is divided into two groups, including an even group 204 and an odd group 206, so that up to two ready instructions may be dispatched in parallel. The illustrated ordered shift queue 202 includes up to 16 entries numbered 0-15, in which each entry is configured to store a corresponding instruction along with any associated information. Each entry is a storage location or slot for storing a corresponding instruction and any associated information. It is noted that the size of the queue, in this case 16 entries, may be different for different configurations. Instructions are issued to (or entered into) the queue 202 beginning at entry 0 up to and ending with entry 15, so that the "oldest" instruction (the first entered into the queue) is at entry 0 and the youngest instruction is at the highest numbered entry that stores an instruction up to entry 15.

Qualify logic 203 scans the instructions in the ordered shift queue 202 to determine whether any one or more of the instructions are ready to be dispatched for execution. An instruction is ready to be executed when the appropriate or corresponding execution unit is available to receive the instruction, and when any operands needed for the instruction are available. In the illustrated embodiment, the qualify logic 203 outputs a set of ready signals indicating which of the instructions are ready to be dispatched as further described herein. The qualify logic 203 may be part of the RS queue 118, or within the reservation stations 108, or external to the reservation stations 108 and part of another block, such as the ROB 110.

The even group 204 is simply a grouping of the even numbered entries 0, 2, 4, . . . , 14, respectively, of the ordered shift queue 202, and the odd group 206 is simply a grouping of the odd numbered entries 1, 3, 5, . . . , 15, respectively, of the ordered shift queue 202. It is noteworthy that the number of entries included in the ordered shift queue 202 is not limited to 16, and it is even not limited that the number of entries included in the ordered shift queue 202 is an even number. That is, the embodiment where the numbers of entries included in the even group 204 and the odd group 206 could differ by 1 is contemplated. The even-numbered entries in the even group 204 are coupled to corresponding inputs of ordered select logic (OSL) 208 for providing a first dispatch instruction DI1, and the odd-numbered entries in the odd group 206 are coupled to inputs of ordered select logic 210 for providing a second dispatch instruction DI2. The ordered select logic 208 and 210 provides the oldest instruction (like instruction DI1 and DI2) in the corresponding group that is ready to be dispatched. In this case, up to two instructions can be dispatched at a time in parallel, one from the even group and one from the odd group as further described herein.

Dispatch logic 212 receives the instructions DI1 and DI2 and dispatches the selected instructions to the execution units 112, such as the execution units 119 and 120. Shift logic 214 shifts the instructions in the ordered shift queue 202 after one or more instructions are dispatched leaving one or more vacant entries. Generally, the instructions are shifted to fill the vacant entries between remaining ones of the stored instructions without changing the order of the remaining ones of the stored instructions. The detail of the shift logic 214 is described further in FIG. 5.

Figure 3:
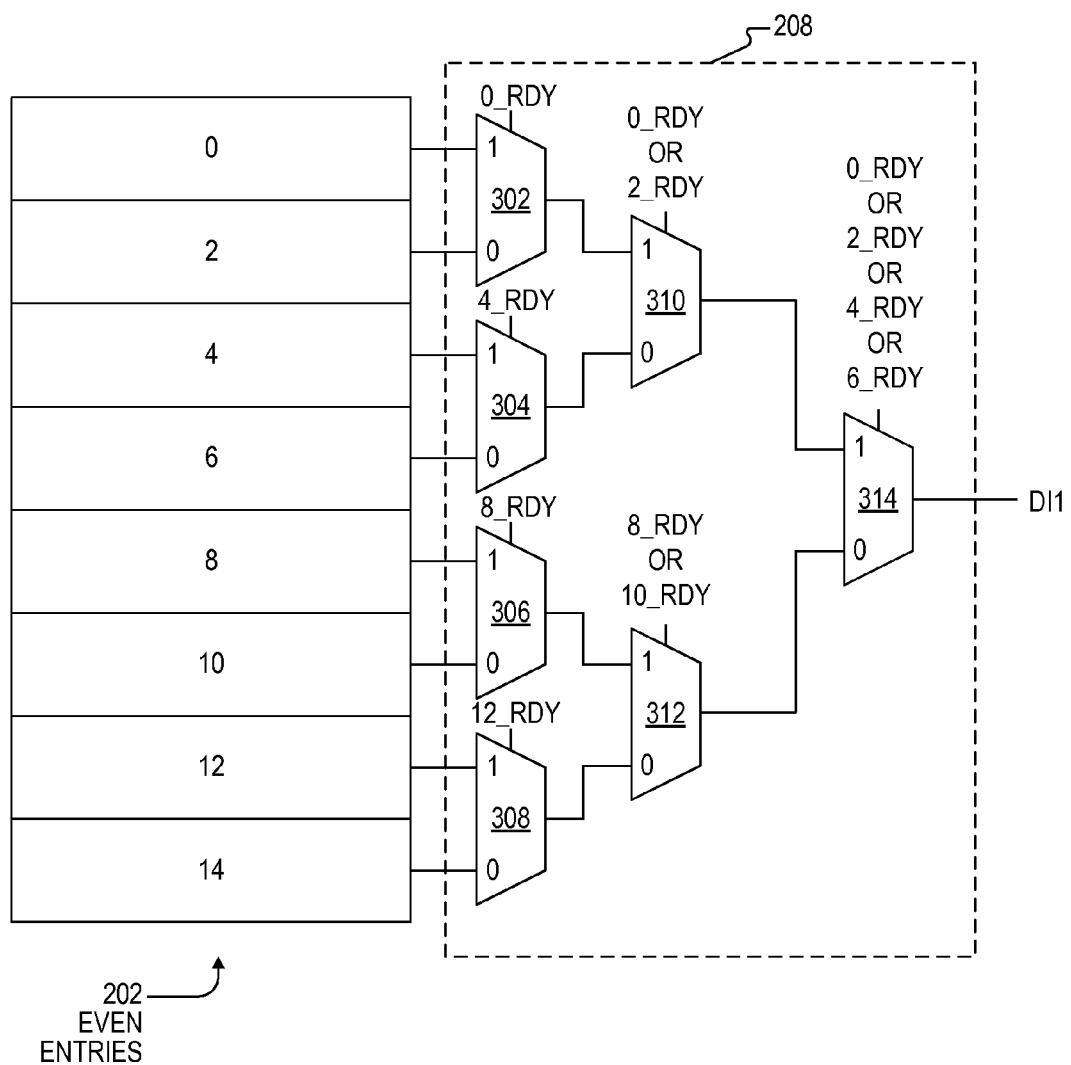
FIG. 3 is a schematic diagram of the ordered select logic coupled to the even numbered entries of the ordered shift queue of FIG. 2.

FIG. 3 is a schematic diagram of the ordered select logic 208 coupled to the even numbered entries of the ordered shift queue 202 (that is, coupled to the even group 204). The ordered select logic 208 includes a binary stack of multiplexers (MUXes) 302, 304, 306, 308, 310, 312 and 314. The MUX 302 has a logic "1" input coupled to entry 0, a logic "0" input coupled to entry 2, a control input receiving a signal 0_RDY, and an output providing selected information. The MUX 304 has a logic "1" input coupled to entry 4, a logic "0" input coupled to entry 6, a control input receiving a signal 4_RDY, and an output providing selected information. The MUX 306 has a logic "1" input coupled to entry 8, a logic "0" input coupled to entry 10, a control input receiving a signal 8_RDY, and an output providing selected information. The MUX 308 has a logic "1" input coupled to entry 12, a logic "0" input coupled to entry 14, a control input receiving a signal 12_RDY, and an output providing selected information. The MUX 310 has a logic "1" input coupled to the output of the MUX 302, a logic "0" input coupled to the output of the MUX 304, a control input receiving a logic OR combination of control signals 0_RDY and 2_RDY, and an output providing selected information. The MUX 312 has a logic "1" input coupled to the output of the MUX 306, a logic "0" input coupled to the output of the MUX 308, a control input receiving a logic OR combination of control signals 8_RDY and 10_RDY, and an output providing selected information. The MUX 314 has a logic "1" input coupled to the output of the MUX 310, a logic "0" input coupled to the output of the MUX 312, a control input receiving a logic OR combination of control signals 0_RDY, 2_RDY, 4_RDY and 6_RDY, and an output providing the first issued instruction DI1.

The control signals 0_RDY, 2_RDY, 4_RDY, 6_RDY, 8_RDY, 10_RDY, and 12_RDY are the ready (RDY) signals generated by the qualify logic 203. Each RDY signal is asserted (or true) when the instruction at the respective one of the entries 0, 2, 4, 6, 8, 10, and 12 is ready to be dispatched. The logic OR of multiple control signal means that the corresponding control signal is true when any one of the control signals is true. When a control input of a MUX is true, then it selects information provided to its logic "1" input as its output; otherwise it selects information provided to its logic "0" input as its output.

In operation of the ordered select logic 208, if the instruction in entry 0 is ready to be dispatched, then 0_RDY is true so the MUX 302 selects and provides the instruction of entry 0 to MUX 310. Since 0_RDY is true, then regardless of the state of 2_RDY, MUX 310 selects and provides the instruction from entry 0 to the MUX 314. Since 0_RDY is true, then regardless of the state of 2_RDY, 4_RDY or 6_RDY, MUX 314 selects and provides the instruction from entry 0 to as the first dispatch instruction DI1. In this manner, if 0_RDY is true indicating that the instruction in entry 0 is ready to be dispatched, then the remaining instructions are bypassed since entry 0 is the oldest instruction that is ready to be dispatched.

Suppose instead that the instruction in entry 6 is the only instruction ready to be dispatched, such that 6_RDY is true while the remaining control signals are false. In this case, since 4_RDY is false, MUX 304 selects and provides the instruction of entry 6 to the MUX 310. Since 0_RDY and 2_RDY are both false, then MUX 310 selects its logic "0" input to select and provide the instruction of entry 6 to the logic "1" input of the MUX 314. Since 6_RDY is true, then MUX 314 selects its logic "1" input to select and provide the instruction of entry 6 as the dispatch instruction DI1.

Suppose instead that the instructions in entry 2 and entry 6 are both ready to be dispatched, such that 2_RDY and 6_RDY are both true while the remaining control signals are false. In this case, MUX 302 selects and provides the instruction of entry 2 to the MUX 310, while MUX 304 selects and provides the instruction of entry 6 to the MUX 310. Since 2_RDY is true, then MUX 310 selects its logic "1" input to select and provide the instruction of entry 2 to the logic "1" input of the MUX 314. Since 2_RDY and 6_RDY are both true, then MUX 314 selects its logic "1" input to select and provide the instruction of entry 2 as the dispatch instruction DI1. In this manner, if 2_RDY and 6_RDY are both true indicating that the instructions in entry 2 and entry 6 are both ready to be dispatched, then the instruction in entry 6 and the remaining instructions are bypassed since entry 2 is the oldest instruction among all the instructions that are ready to be dispatched.

In summary, the ordered select logic 208 selects the oldest instruction of the even-numbered entries that is also ready to be dispatched as the first instruction to be dispatched. The ordered select logic 210 has substantially the same structure and operates in substantially the same manner to select the oldest ready instruction of the odd-numbered entries as the second dispatch instruction DI2. The oldest ready instruction is a instruction that is stored in an entry with a smallest entry number among all the entries storing the instructions that are ready to be dispatched in each group.

Figure 4:
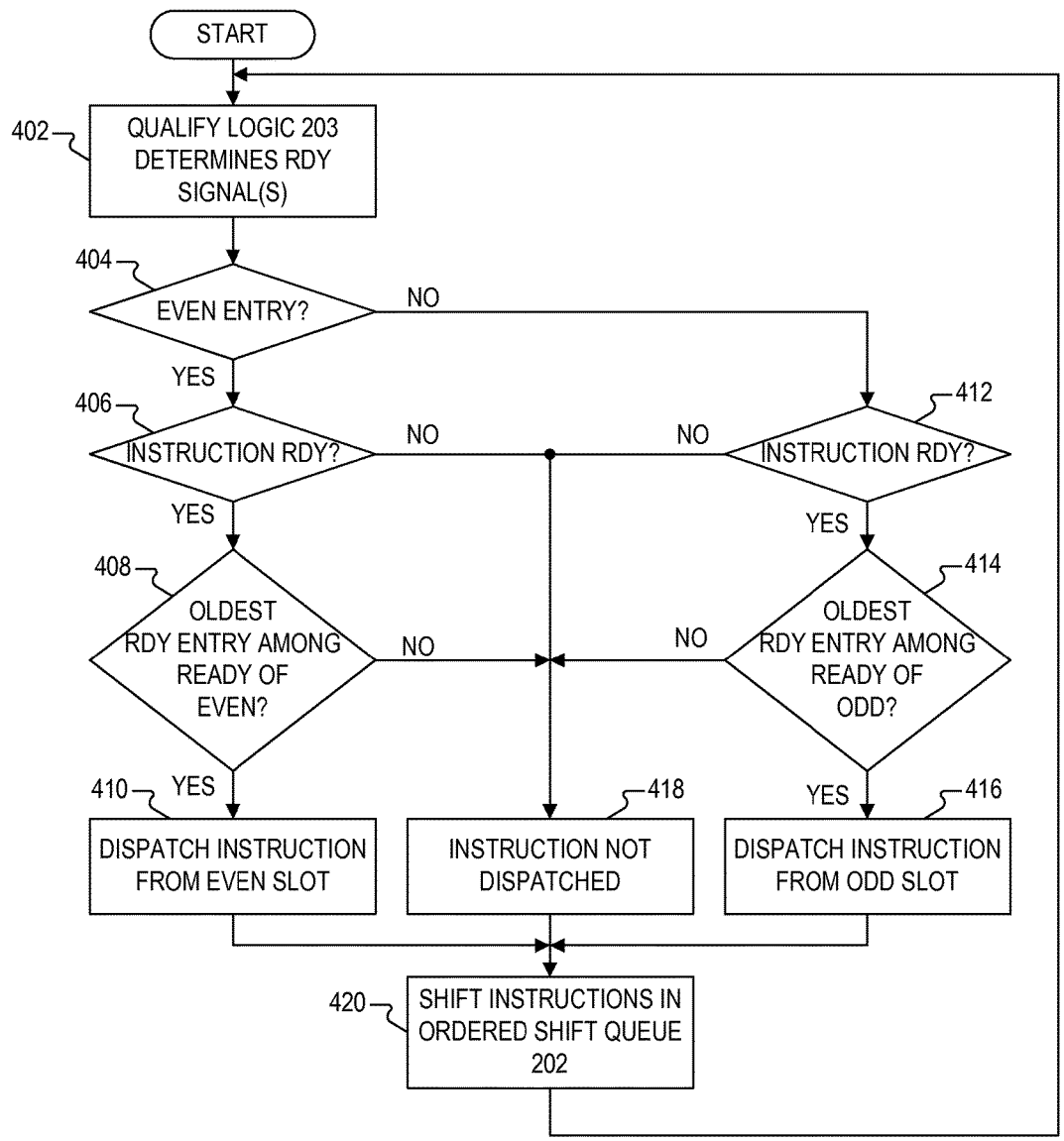
FIG. 4 is a flowchart diagram illustrating a method of parallelized multiple dispatch for ordered queue arbitration according to one embodiment of the present invention.

FIG. 4 is a flowchart diagram illustrating a method of parallelized multiple dispatch for ordered queue arbitration according to one embodiment of the present invention. At a first block 402, the qualify logic 203 determines whether the instruction of a given entry is ready to be dispatched and asserts the corresponding RDY signal, or otherwise scans the instructions of the ordered shift queue 202 to determine which instructions are ready for dispatch and asserts one or more of the control signals 0_RDY-15_RDY. It is noted that the qualify logic 203 may continuously scan the instructions stored within the ordered shift queue 202 and assert the RDY signals. Also, the RDY signals are adjusted when the instructions are shifted by the shift logic 214. At next block 404, it is queried whether the next entry is even. If so, operation proceeds to block 406 in which it is queried whether the instruction of the even entry is ready to be issued (e.g., the corresponding RDY signal is asserted). If so, operation proceeds to block 408 in which it is queried whether the entry is the oldest among the even entries which are all ready to be dispatched. The determinations of blocks 406 and 408 are made by the ordered select logic 208. If yes at block 408, then operation proceeds to block 410 in which the instruction is dispatched from the corresponding even slot of the ordered shift queue 202 in which it is located. The ordered select logic 208 performs this process once the control signals are determined for each of the even numbered entries.

A similar process may be performed in parallel for the odd numbered entries. At block 404, if the entry is not even, then operation proceeds to block 412 for an odd entry in which it is queried whether the instruction of the entry is ready to be issued. If so, operation proceeds to block 414 in which it is queried whether the entry is the oldest among the odd entries which are all ready to be dispatched. The determinations of blocks 412 and 414 are made by the ordered select logic 210. If so, then operation proceeds to block 416 in which the instruction is dispatched from the corresponding odd slot of the ordered shift queue 202 in which it is located. The ordered select logic 210 performs this process once the control signals are determined for each of the odd numbered entries. If an even or odd entry is either not ready to be dispatched or is not the oldest among the ready entries in corresponding group, then operation proceeds to block 418 in which the instruction is not dispatched.

From any one of the blocks 410, 416 and 418, operation proceeds to block 420 in which the instructions in the ordered shift queue 202 are shifted by the shift logic 214 towards the 0 entry to fill in the one or more entries that were vacated by the dispatched instructions. The shift operation is further described herein. Operation then returns to block 402 to repeat the process for the next instructions to be dispatched.

Figure 5:
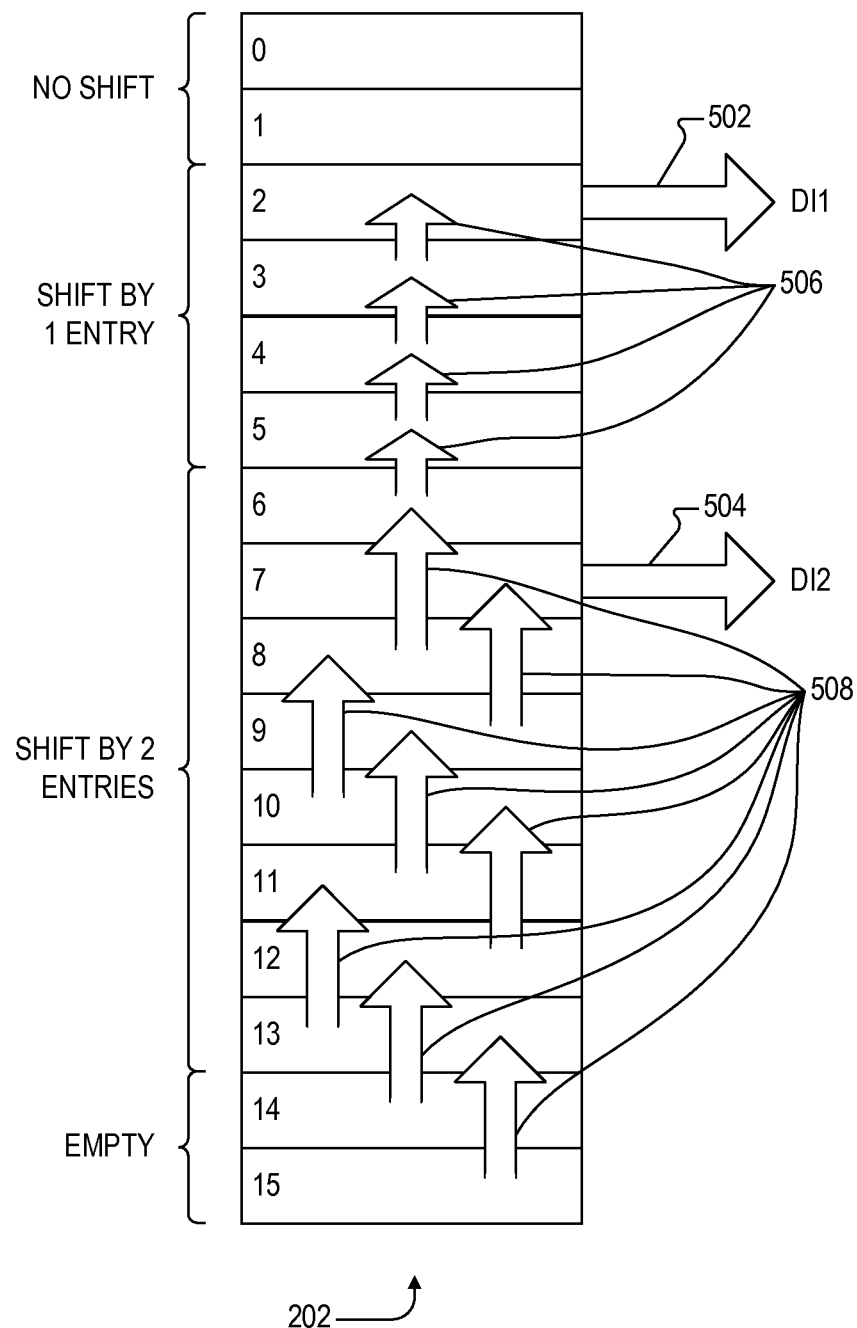
FIG. 5 is a block diagram of a shift operation performed by the shift logic on the ordered shift queue of FIG. 2 when dispatching up to two instructions at a time.

FIG. 5 is a block diagram of a shift operation performed by the shift logic 214 on the ordered shift queue 202 when dispatching up to two instructions at a time. In this case, an instruction from entry 2 and another instruction from entry 7 have both been dispatched in parallel as DI1 and DI2. The oldest instructions in entries 0 and 1 keep their position and are not shifted so that they remain located at the oldest entries 0 and 1. Since entry 2 is vacated, the instructions of the entries 3-6 are each shifted by 1 entry so that they are moved into entries 2-5, respectively, as indicated by single-shift arrows 506. Since entry 7 is also vacated, the instructions of the entries 8-15 are each shifted by 2 entries so that they are moved into entries 6-13, respectively, as indicated by double-shift arrows 508. After the shift operation is completed, the last two entries 14 and 15 are empty so that they may receive the next two newest instructions. Operation is repeated in a similar manner for the next one or two instructions that are dispatched. For example, if the instructions in entries 0 and 1 are next issued in parallel, then the instructions of entries 2-15 (assuming entries 14 and 15 have since been filled) are each shifted two positions to fill the respective entries 0-13 leaving the last two entries 14 and 15 empty.

Figure 6:
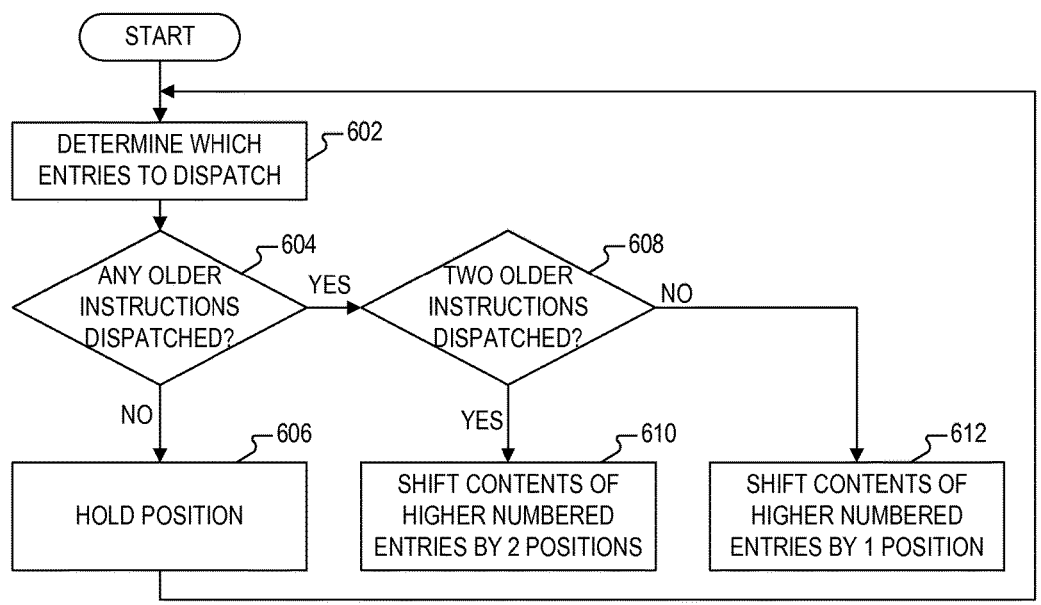
FIG. 6 is a flowchart diagram illustrating shift operation of the ordered shift queue by the shift logic of FIG. 2 according to one embodiment of the present invention.

FIG. 6 is a flowchart diagram illustrating shift operation of the ordered shift queue 202 by the shift logic 214 according to one embodiment of the present invention. At first block 602, it is determined whether any entries are ready to be dispatched in any given cycle. At next block 604, it is queried whether any older entries were dispatched. It is noted that if for any reason only the youngest one or more instructions are dispatched (i.e., only the instructions at the lowest entries of the queue), then shift is not necessary. If no older instructions are dispatched, then the contents of each of the entries hold their respective positions as indicated at block 606. If instead there is at least one older entry dispatched as determined at block 604, then operation proceeds instead to block 608 in which it is queried whether 2 older entries have been dispatched. If so, then the shift operation is performed to shift each higher numbered entry by two positions at block 610. If instead only one entry was dispatched, then operation proceeds to block 612 in which each higher numbered entry is shifted by one position. Operation then returns to block 602 from blocks 606, 610 or 612 to repeat the process for the next iteration.

Figure 7:
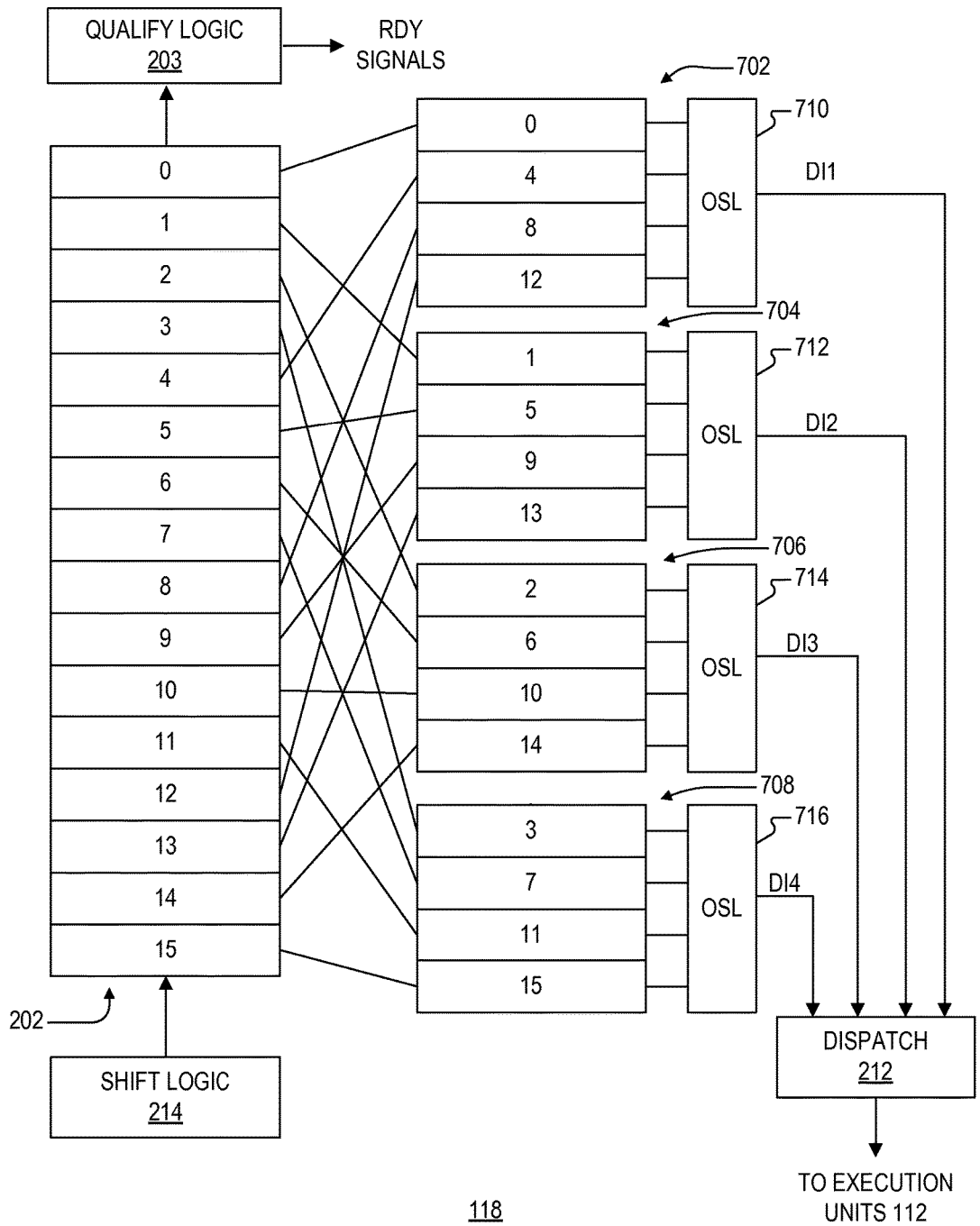
FIG. 7 is a simplified block diagram of the RS queue of FIG. 1 according to another embodiment of the present invention in which an ordered shift queue is divided into four groups.

FIG. 7 is a simplified block diagram of the RS queue 118 according to another embodiment of the present invention in which an ordered shift queue 202 is divided into four groups 702, 704, 706 and 708, so that up to four ready instructions may be dispatched in parallel. In this case, each group includes every 4 entry. Thus, the first group 702 includes entries 0, 4, 8 and 12, the second group 704 includes entries 1, 5, 9 and 13, the third group 707 includes entries 2, 6, 10 and 14, and the fourth group 708 includes entries 3, 7, 11 and 15. The qualify logic 203 is included and operates in similar manner, in which it may shift some instructions up to four slots at a time. Each group includes ordered select logic in a similar manner as shown in FIG. 2, including ordered select logic 710 for the first group 702 dispatching a first instruction DI1, ordered select logic 712 for the second group 704 dispatching a second instruction DI2, ordered select logic 714 for the third group 706 dispatching a third instruction DI3, and ordered select logic 716 for the fourth group 708 dispatching a fourth instruction DI4. Each ordered select logic operates in a similar manner as the ordered select logic shown in FIG. 3 for determining an oldest instruction among instructions that are ready to dispatch for each group. In this manner, the RS queue 118 shown in FIG. 7, which is divided into four groups, dispatches up to four instructions in parallel at a time. The dispatch logic 212 is included for dispatching the instructions DI1-DI4 to the execution units 112.

It is worth noting that the number of entries included in the ordered shift queue 202 is not limited to 16. The number of entries included in the ordered shift queue 202 is not even limited to a number of entries that are equally divisible by 4. An embodiment is contemplated in which the number of entries included in different ones of the four groups may differ by 1. In summary, if the ordered shift queue 202 is divided into four groups, the four groups may include a first group including entries whose entry numbers are 4n, a second group including entries whose entry numbers are 4n+1, a third group including entries whose entry numbers are 4n+2 and a fourth group including entries whose entry numbers are 4n+3, in which n is an integer greater than or equal to 0. The embodiments where the ordered shift queue 202 is divided into other numbers of groups are also contemplated. For example, if the ordered shift queue 202 is divided into 3 groups, the three groups includes a first group including entries whose entry numbers are 3n, a second group including entries whose entry numbers are 3n+1, a third group including entries whose entry numbers are 3n+2, wherein n is an integer greater than or equal to 0.

It is appreciated that in general, an ordered shift queue of any given size may be divided into N groups for dispatching up to N instructions in parallel, in which an i'th group includes every i'th entry of every N entries of the ordered queue, wherein i is an integer less than or equal to N, that is, i=1, 2, . . . N. For example, N may be 3 for dispatching up to 3 instructions at a time. Ordered select logic selects the oldest ready instruction of each group, which is dispatched by dispatch logic to one of N execution units of the same type. Shift logic shifts the instructions in the ordered queue to fill any vacant entries between remaining instructions in the ordered queue. Although the present invention is illustrated for use as one or more reservation station queues in a microprocessor, a parallel multiple dispatch system and method for ordered queue arbitration may be applied to other applications in which it is desired to issue candidates of any type in order to the queue, to dispatch the candidates from the queue when ready to be dispatched, and to maintain order within the queue by shifting the candidates to fill vacated queue slots. The technology of parallelized multiple dispatching with unified shift disclosed herein will make sure the dynamic balance of the ordered queue. The larger the size of the ordered queue is, the more the ordered queue will benefit from this invention.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A parallelized multiple dispatch ordered queue, comprising:
    an ordered queue that is configured to store candidates in order from oldest to youngest into a plurality of entries, wherein said ordered queue is divided into N groups in which an i'th group includes every i'th entry of every N entries of the ordered queue, wherein i is an integer less than or equal to N;
    qualify logic that determines whether any of said stored candidates in said ordered queue is ready to be dispatched from said ordered queue;
    ordered select logic that respectively determines an oldest candidate in each group of said ordered queue that is ready to be dispatched;
    a plurality of execution units;
    dispatch logic that dispatches candidates from said N groups in parallel to said plurality of execution units, wherein said dispatch logic dispatches said oldest candidate in each group that is ready to be dispatched and leaving at least one vacant entry in said ordered queue, and wherein each of said dispatched candidates is sent to any available one of said plurality of execution units, wherein said any available one of said plurality of execution units refers to an execution unit being able to accept said each of said dispatched candidates and when the execution unit is not available, said any available one of said plurality of execution units refers to another execution unit being able to accept said each of said dispatched candidates; and
    shift logic that shifts said stored candidates in said ordered queue to fill said vacant entry between remaining ones of said stored candidates without changing an order of said remaining ones of said stored candidates in said ordered queue.

2. The parallelized multiple dispatch ordered queue of claim 1, wherein N is 2 dividing the ordered queue into an even group and an odd group.

3. The parallelized multiple dispatch ordered queue of claim 1, wherein N is 4 dividing the ordered queue into 4 groups, which include a first group including entries whose entry numbers are 4n, a second group including entries whose entry numbers are 4n+1, a third group including entries whose entry numbers are 4n+2 and a fourth group including entries whose entry numbers are 4n+3, wherein n is an integer greater than or equal to 0.

4. The parallelized multiple dispatch ordered queue of claim 1, wherein N is 3 dividing the ordered queue into 3 groups, which include a first group including entries whose entry numbers are 3n, a second group including entries whose entry numbers are 3n+1, a third group including entries whose entry numbers are 3n+2, wherein n is an integer greater than or equal to 0.

5. The parallelized multiple dispatch ordered queue of claim 1, wherein said stored candidates comprise instructions of a microprocessor, and wherein said qualify logic determines whether any stored instruction is ready for execution by the microprocessor.

6. The parallelized multiple dispatch ordered queue of claim 5, wherein said dispatch logic dispatches up to N instructions at a time to N execution units of the same type.

7. The parallelized multiple dispatch ordered queue of claim 1, wherein:
    said qualify logic asserts a plurality of ready signals indicating which of said stored candidates are ready to be dispatched; and
    wherein said ordered select logic comprises a plurality of multiplexers, each controlled by at least one of said plurality of ready signals.

8. The parallelized multiple dispatch ordered queue of claim 1, wherein:
    said qualify logic asserts a plurality of ready signals indicating which of said stored candidates are ready to be dispatched; and
    wherein said ordered select logic comprises a plurality of stacks of multiplexers, wherein each stack of multiplexers corresponds to each of said N groups, wherein each multiplexer is controlled by at least one of said plurality of ready signals, and wherein each said stack of multiplexers outputs said oldest candidate of a corresponding one of said N groups that is ready to be dispatched.

9. The parallelized multiple dispatch ordered queue of claim 1, wherein: said oldest candidate in each group that is ready to be dispatched is a candidate that is stored in an entry with a smallest entry number among all the entries storing said stored candidates that are ready to be dispatched in each group.

10. A microprocessor, comprising:
a register alias table that issues instructions in program order to a parallelized multiple dispatch ordered queue;
wherein said parallelized multiple dispatch ordered queue comprises:
an ordered queue that is configured to store said instructions in program order received from said register alias table from oldest to youngest into a plurality of entries, wherein said ordered queue is divided into N groups in which an i'th group includes every i'th entry of every N entries of the ordered queue, wherein i is an integer less than or equal to N;
qualify logic that determines whether any of said stored instructions in said ordered queue is ready to be dispatched from said ordered queue for execution;
ordered select logic that respectively determines an oldest instruction in each group of said ordered queue that is ready to be dispatched;
dispatch logic that dispatches instructions from said N groups in parallel, wherein said dispatch logic dispatches said oldest instruction in each group that is ready to be dispatched leaving a vacant entry in said ordered queue; and
shift logic that shifts said instructions stored in said ordered queue to fill said vacant entry between remaining ones of said stored instructions without changing program order of said remaining ones of stored instructions in said ordered queue; and
N execution units of the same type, each configured to execute said instructions stored in said ordered queue, wherein each of said dispatched instructions from dispatch logic is sent to any available one of said N execution units, wherein said any available one of said N execution units refers to an execution unit being able to accept said each of said dispatched instructions and when the execution unit is not available, said any available one of said N execution units refers to another execution unit being able to accept said each of said dispatched instructions.

11. The microprocessor of claim 10, wherein N is 2 to divide said ordered queue into an even group and an odd group for execution by 2 execution units of the same type.

12. The microprocessor of claim 10, wherein N is 4 to divide said ordered queue into four groups for execution by 4 execution units of the same type, wherein said four groups include a first group including entries whose entry numbers are 4n, a second group including entries whose entry numbers are 4n+1, a third group including entries whose entry numbers are 4n+2 and a fourth group including entries whose entry numbers are 4n+3, wherein n is an integer greater than or equal to 0.

13. The microprocessor of claim 10, wherein:
said qualify logic asserts a plurality of ready signals indicating which of said stored instructions are ready to be dispatched to one of said N execution units; and
wherein said ordered select logic comprises a plurality of multiplexers, each controlled by at least one of said plurality of ready signals.

14. The microprocessor of claim 10, wherein:
said qualify logic asserts a plurality of ready signals indicating which of said stored instructions are ready to be dispatched to one of said N execution units; and
wherein said ordered select logic comprises a plurality of stacks of multiplexers, wherein each stack of multiplexers corresponds to each of said N groups, wherein each multiplexer is controlled by at least one of said plurality of ready signals, and wherein each said stack of multiplexers outputs said oldest instruction of a corresponding one of said N groups that is ready to be dispatched.

15. A method of dispatching multiple candidates from an ordered queue in parallel, comprising:
storing candidates in order into an ordered queue from oldest to youngest, in which the ordered queue is divided into N groups in which an i'th group includes every i'th entry of every N entries of the ordered queue, wherein i is an integer less than or equal to N;
determining whether any of the stored candidates in the ordered queue is ready to be dispatched from the ordered queue;
determining an oldest candidate respectively in each group of the ordered queue that is ready to be dispatched;
dispatching candidates from the N groups in parallel to a plurality of execution units including said oldest candidate in each group that is ready to be dispatched and leaving at least one vacant entry in the ordered queue, and wherein each of the dispatched candidates is sent to any available one of the plurality of execution units, wherein said any available one of said plurality of execution units refers to an execution unit being able to accept said each of the dispatched candidates and when the execution unit is not available, said any available one of said plurality of execution units refers to another execution unit being able to accept said each of the dispatched candidates; and
shifting the stored candidates in the ordered queue to fill the vacant entry between remaining ones of the stored candidates without changing an order of the remaining ones of the stored candidates in the ordered queue.

16. The method of claim 15, wherein N is 2 thus dividing the ordered queue into an even group and an odd group.

17. The method of claim 15, wherein N is 4 thus dividing the ordered queue into 4 groups, which include a first group including entries whose entry numbers are 4n, a second group including entries whose entry numbers are 4n+1, a third group including entries whose entry numbers are 4n+2 and a fourth group including entries whose entry numbers are 4n+3, wherein n is an integer greater than or equal to 0.

18. The method of claim 15, wherein N is 3 thus dividing the ordered queue into 3 groups, which include a first group including entries whose entry numbers are 3n, a second group including entries whose entry numbers are 3n+1, a third group including entries whose entry numbers are 3n+2, wherein n is an integer greater than or equal to 0.

19. The method of claim 15, wherein the stored candidates comprise instructions of a microprocessor, and wherein said determining whether any of the stored candidates in the ordered queue is ready to be dispatched from the ordered queue comprises determining whether any stored instruction is ready for execution by the microprocessor.

20. The method of claim 15, further comprising:
asserting a plurality of ready signals indicating which of the stored candidates are ready to be dispatched; and
using the plurality of ready signals to select among pairs of the stored candidates and among selected candidates to respectively determine said oldest candidate in each group of the ordered queue that is ready to be dispatched.

* * * * *